(12) United States Patent
Hol et al.

(10) Patent No.: US 8,344,948 B2
(45) Date of Patent: Jan. 1, 2013

(54) POSITIONING SYSTEM CALIBRATION

(75) Inventors: Jeroen D. Hol, Enschede (NL); Hendrik Johannes Luinge, Enschede (NL); Per Johan Slycke, Schalkhaar (NL)

(73) Assignee: Xsens Holding B.V., Enschede (NL)

( * ) Notice: Subject to any disclaimer, the term of this patent is extended or adjusted under 35 U.S.C. 154(b) by 110 days.

(21) Appl. No.: 12/749,494

(22) Filed: Mar. 29, 2010

(65) Prior Publication Data

US 2011/0234452 A1    Sep. 29, 2011

(51) Int. Cl.
*G01S 3/02* (2006.01)
(52) U.S. Cl. ........................................................ 342/451
(58) Field of Classification Search .................... 342/451
See application file for complete search history.

(56) References Cited

U.S. PATENT DOCUMENTS

| | | | | |
|---|---|---|---|---|
| 8,116,350 | B1 * | 2/2012 | Arndt et al. ................... | 375/130 |
| 2004/0108954 | A1 * | 6/2004 | Richley et al. ................. | 342/387 |
| 2006/0238411 | A1 * | 10/2006 | Fullerton et al. ............... | 342/147 |
| 2009/0201907 | A1 * | 8/2009 | Nanda et al. ................... | 370/345 |

FOREIGN PATENT DOCUMENTS

WO    WO 2005/047925 A1    5/2005

OTHER PUBLICATIONS

Cooper G. et al., Inertial sensor-based knee flexion/extension angle estimation, *Journal of Biomechanics* 42 (2009) pp. 2678-2685.
International Search Report and Written Opinion from PCT/IB2011/000637 filed on Mar. 24, 2011.

* cited by examiner

*Primary Examiner* — Harry Liu
(74) *Attorney, Agent, or Firm* — Miller, Matthias & Hull LLP

(57) ABSTRACT

The described principles provide a method and system for calibrating an UWB RF positioning system. Means for automated calibration of the UWB RF positioning system allow calibration based on simple user input that does not require accuracy. Thus, the disclosed calibration means enables nomadic deployment of UWB RF positioning systems by enabling fast and easy calibration and re-calibration of the system based on in-use data to correct for changes in the system during use. Furthermore, in an embodiment of the invention, means are provided for direct feedback of calibration accuracy to the user. In a further embodiment of the invention, the full use of a UWB positioning system is enabled by obtaining optimal accuracy even at the outskirts of the tracking space and by providing optimal accuracy for a given number of receivers.

5 Claims, 6 Drawing Sheets

POSITIONING SYSTEM CALIBRATION

BACKGROUND OF THE INVENTION

In a number of industries and endeavors, it is important to be able to track the location of an object. For example, a human body may be tracked for purposes of animation or sports analysis, or an item of equipment may be tracked for security or logistics purposes. Numerous internally and externally referenced systems have been used for such purposes, but there are still many issues to solve in terms of occlusion, lag, resolution, economical feasibility of the required installation, and so on.

Ultra-wideband (UWB) RF positioning is a relatively new positioning technology that is especially useful for indoor applications. Among the more mature applications of UWB are the so-called asset tracking systems in, e.g., health-care or manufacturing. Commercially available systems may consist of a network of time synchronized UWB receivers which track a large number of small, battery powered and inexpensive UWB transmitters. Typically the time synchronization is implemented using a phase synchronization implying that there is one central clock which drives all the others, but that each receiver might have a (constant) clock offset.

Shorter RF pulses generally enable higher spatial resolution, as would be expected. With reference to the Fourier spectrum of pulse trains or sequences, a broader spectrum is required to produce such shorter pulses. Thus UWB technology is able to make use of very short pulses, typically on the order of 1 ns or less, resulting in a very high spatial resolution as well as relatively good robustness to multipath propagation of the RF signals. RF-based positioning technologies can be roughly subdivided into three categories: systems using time delay, systems using angle-of-arrival and systems using signal strength.

With respect to systems that infer position from the time needed for a signal to travel from the transmitter to the receiver, these systems can localize the position of the transmitters by recording at each receiver the time of arrival (TOA) of an RF-signal transmitted by the transmitter and using this TOA data to calculate the position of the transmitter, typically using known methods such as trilateration or multilateration. However, before any such calculations can be performed, the exact position of each receiver in space must be known, and the relative clock offset between each receiver must also be known with great accuracy. In other words, the system must be calibrated before it can be used for tracking the position of the transmitters. In this context, the calibration parameters consist of receiver positions and receiver clock parameters.

Existing calibration methods focus exclusively on the receiver clock parameters and require the receiver positions and the positions of calibration transmitters placed in the measurement space to be surveyed manually prior to carrying out the calibration and prior to use. The surveying of the receiver positions and calibration transmitter positions is typically a labor intensive and time consuming process, prone to measurement errors, and as such is only feasible for permanent setups, typically in logistics applications, where the setup is part of the permanent ICT infrastructure of a building. The receiver positions and calibration transmitter positions can also be derived approximately from floor plans and installation information in a building. However, such estimated receiver positions, as well as any receiver position errors in surveying can have a disproportionate impact on overall system accuracy, depending on the receiver geometry and the transmitter position in-use.

Furthermore, an often overlooked fact is that spatial inaccuracy in the position of the receivers and/or calibration transmitters placed in the measurement space directly causes errors in the clock offset calibration of the receivers, i.e. spatial and temporal calibration parameters are closely linked and can cause non-intuitive errors in the system performance as a whole. Such system performance degradation can be reduced by introducing more receivers in the system installation, and errors can often be reduced by limiting the use of the system to pre-defined areas with better performance, typically a space enclosed by several receivers. However, current calibration methods have no means of making errors caused by erroneous calibration known to the user. Hence the user may only become aware of a need for improved calibration by noticing inadequate system performance during use.

Moreover, certain applications of UWB positioning systems require the system to be portable and easy to move from one location to another (nomadic), such as to assist in motion capture in films, or to enable games and biomechanics uses. Many applications demand easy and fast deployment in the field in un-controlled environments, such as military/firefighters/police and first responder personnel tracking applications, and such applications are currently hampered by inadequate calibration means.

In particular for mobile setups of a UWB positioning system the need for frequent calibration is evident. Notably, since the time calibration accuracy required is so high (in the order of pico seconds) even exchanging cables in the system or movement of the cables used for time synchronization of the receivers can cause a need for re-calibration. Especially, movement of the cables during use can cause small errors in the system calibration while in-use and would ideally be countered by methods providing in-use calibration.

Furthermore, a very important advantage of RF positioning system, in particular UWB based RF positioning systems, is that they do not suffer from occlusion (blockage of line-of-sight) as in the case of a commonly used optical system based on cameras and active or passive markers, since the RF signal can travel through most materials except metals. Thus the receivers in an RF-based positioning system do not need to have (optical) line of sight to the transmitter being tracked, or indeed to each other. However, in calibration methods known in the art, based on manual surveying, typically using laser rangers and/or "total station" survey equipment (electronic theodolite) are based on optical measurement techniques. Hence, the calibration methods known in the art require line-of-sight between the receivers for calibration, eliminating one of the main benefits of using a RF-based positioning system.

The reader is advised that the foregoing background discussion is not intended to survey the prior art, nor is it intended as an inference or admission that any technique, system or methodology discussed herein is known in the art. Rather, this section is intended only to discuss problems considered by the inventors themselves. For a full and accurate understanding of actual prior art, please refer to actual prior art references and documentation.

BRIEF SUMMARY OF THE INVENTION

The invention provides a system and apparatus for calibrating an RF positioning system that eliminates or minimizes the above mentioned drawbacks. In an embodiment of the invention, means are provided for automated calibration of an RF positioning system based on simple user or a priori input that does not require accuracy. Thus, the disclosed calibration means enables nomadic deployment of RF positioning systems by enabling fast and easy calibration and re-calibration of the system based on in-use data to correct for changes in the system during use. Furthermore, in an embodiment of the invention, means are provided for direct feedback of calibration accuracy to the user. In a further embodiment of the invention, the full use of a RF positioning system is enabled by obtaining optimal accuracy even at the outskirts of the tracking space and by providing optimal accuracy for a given number of receivers.

The disclosed method allows complete calibration of an RF positioning system without the need for manual surveying or measurement, in that the provided method determines both the receiver positions and their clock parameters. The disclosed method thus removes the need for the labor intensive, error prone and time consuming process of surveying the receiver positions and allows for flexible and mobile setups with a very fast setup-time. This disclosure focuses on time-based methods (where position is inferred from signal travel time), but this is just by way of example, and the described principles are not limited to such systems.

In various embodiments of the invention, the RF positioning system utilizes UWB technology, but it will be appreciated that other systems will be suitable as well for use within the described principles.

Other objects and advantages of the invention will become apparent upon reading the following detailed description and upon reference to the drawings.

DETAILED DESCRIPTION OF THE INVENTION

Figure 1:
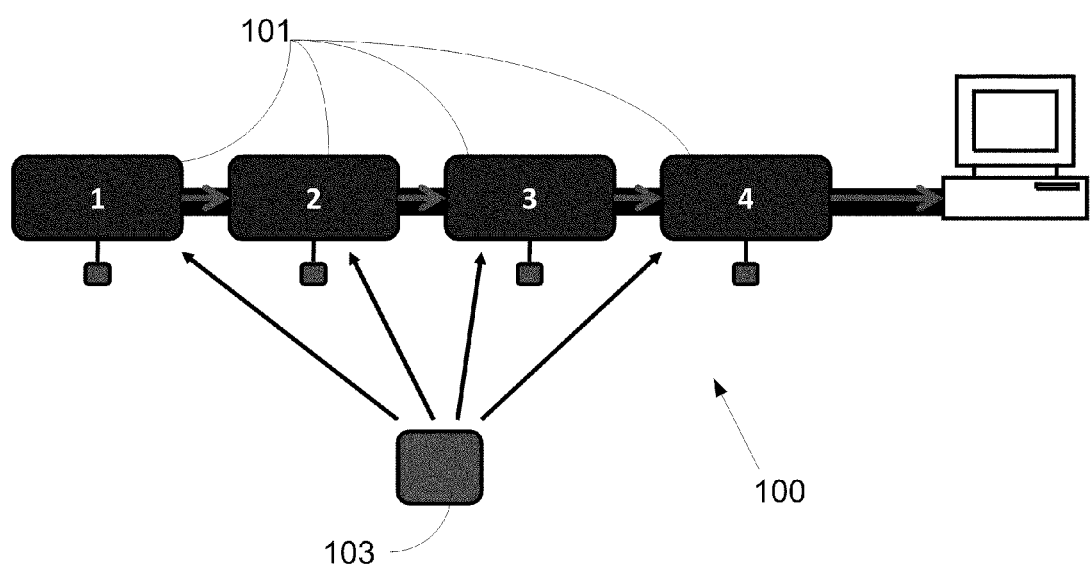
FIG. 1 is a schematic diagram of a UWB system including a network of synchronized and stationary receivers taking time-of-arrival (TOA) measurements of signals originating from a transmitter in accordance with the described principles.

Prior to discussing specific techniques and implementations, an exemplary RF positioning system, for use as a basis of discussion, will be described by reference to FIG. 1. The illustrated UWB system 100 consists of a network of synchronized and stationary (rigidly fixed, mounted) receivers 101, all taking very precise time-of-arrival (TOA) measurements of signals originating from a transmitter 103. That is, the TOA measurement $\gamma_{mnk}$ is the time (according to its local clock) where receiver m receives the k-th pulse from transmitter n. It can be modeled as $$\gamma_{mnk} = \tau_{nk} + \|r_m - t_{nk}\|_2 + \Delta\tau_m + \delta_{mnk} + e_{mnk} \quad (1)$$

Where $\tau_{nk}$ is the time-of-transmission of the k-th pulse from transmitter n, $t_{nk}$ is the position of transmitter of the k-th pulse from transmitter n, $r_m$ is the position of the m-th receiver and $\Delta\tau_m$ is the clock-offset of the m-th receiver. $\delta_{mnk} \geq 0$ is a possibly nonzero delay due to non line-of-sight conditions or multipath and $e_{mnk}$ is Gaussian noise.

Without loss of generality, all quantities in equation (1) are expressed in meters. This disclosure assumes the use of "clean" measurements, i.e., which can for instance be achieved using outlier rejection techniques, for ease of explanation, although such are not necessarily required. Moreover, to avoid confusion, the subscripts m, n and k will be dropped when their value can be inferred from the context.

The transmitter clocks are not sufficiently accurate to know the precise time-of-transmission $\tau$. Moreover, since only one-way communication is possible, in this example, transmitter clocks are not synchronized to the receiver clocks. Therefore, every time-of-transmission is treated as an unknown parameter here. Often methods known in the art use of time difference of arrival (TDOA) measurements with the purpose of eliminating the need to know or estimate the time of transmission, however, this introduces unwanted correlations between the pair of receivers used to calculate the TDOA that makes it difficult to know which receiver is measuring accurately, and which ones not. Hence, the TDOA approach is not adopted here, although in principle it could be used in keeping with the disclosed principles.

The disclosed calibration method estimates the calibration parameters from a dataset containing time-of-arrival measurements from one or more transmitters that move through the space of interest. The parameters that are estimated not only include the calibration parameters—receivers position and clock parameters—but also the transmitter trajectory as well as its time-of-transmissions, where all spatial parameters are considered to be 3 dimensional. It is because of these additional, seemingly superfluous parameters of the transmitter, that the complete calibration parameters can be estimated, including the full 3D receiver positions. The estimation is formulated herein as a maximum likelihood optimization calculation, but it will be appreciated that other approximate formulations and closed form solutions may be used as well.

Figure 2:
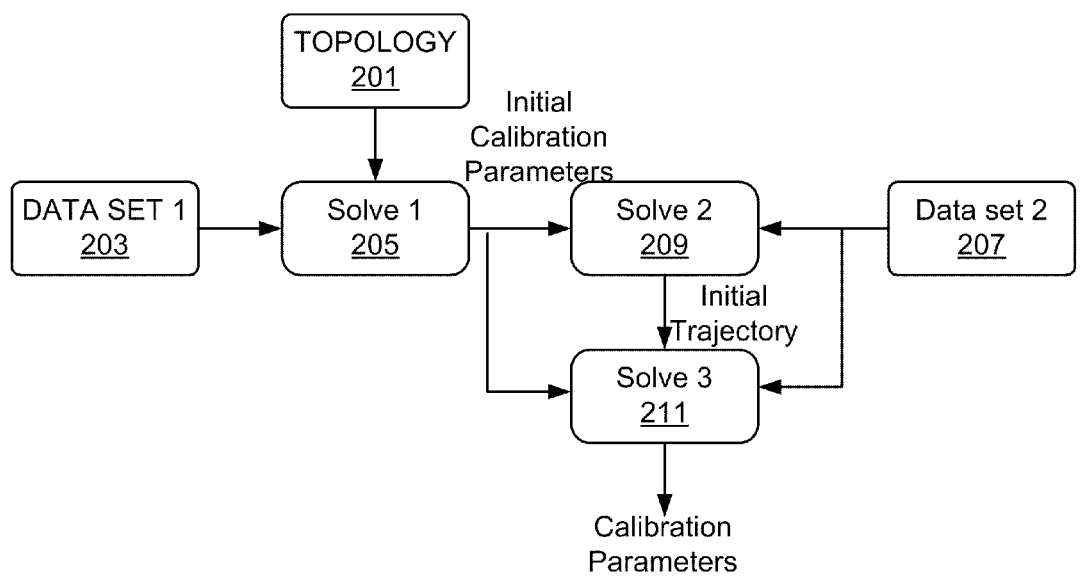
FIG. 2 is a logic diagram showing the overall functioning of the a system according to the described principles.

In overview to guide the reader, one embodiment of the disclosed calibration method consists of the following steps, given by reference to the logic diagram of FIG. 2. First, a very rough estimate 201 of the overall topology of the system setup is input in order to avoid mirrored or rotated solutions in the final output. Then, a first dataset D1 203 is collected using transmitters placed in significant proximity to the receivers to obtain a first rough estimate of the calibration parameters (Solve 1, 205). Then, a second dataset D2 207 is collected, of one or more transmitters moving through the space of interest. The dataset D2 and the initial calibration parameters resulting from (Solve 1) are then used to calculate a rough trajectory of the transmitter (Solve 2, 209). Note that the initial calibration parameters are not modified in this step, but are kept constant. Although the term 'trajectory' is used here and elsewhere in this description, it will be appreciated that the determined positions may or may not have a correlation.

Solve 2 is calculated for each transmission (i.e. Solve 2 is repeated for each transmission instance) and the resulting output is an initial estimate of the trajectory of the transmitter. Based on the initial calibration parameters (from Solve 1), and the estimated initial trajectory from the multiple solves (in Solve 2), together providing a complete initialization parameter vector, all the parameters (including the sought calibration parameters) can now be solved for (Solve 3, 211) to obtain the best fit of the calibration parameters (optimal in a statistical sense) for the measured dataset D2.

Having discussed the inventive method in overview, the details of an implementation will now be discussed in greater detail. The method requires a non-degenerate setup with receivers and a transmitter trajectory of $$N > 4 + \frac{9}{M-4}$$

positions in order to function for the general, non-limited 3D case. Furthermore, since the calibration method is related to the tracking problem, certain requirements on the setup are inherited from tracking. For example, the receivers need to be placed such that, everywhere in the volume of interest, a transmitter can be received by at least 4 receivers.

The non-degeneracy of the setup is related to its geometric configuration. In general, for the 3D case, the receivers cannot be planar, e.g. at least one receiver has to be out of plane and the same hold for the transmitter trajectory. When these conditions are violated, for instance by having a 2D setup (implying a system that only needs to calculate 2D (horizontal) positions, given a fixed transmitter height as input) as is very common in logistics applications, parts of the parameter vector become unobservable. These problems can be overcome by adding additional constraints (i.e. assumptions about the motion of the transmitter or the position of the receiver), for instance by specifying the receiver height and/or the height of the transmitter trajectory. Alternatively, one or more temporary out-of-plane receivers can be used during calibration of the system that can, optionally, be removed once calibration is complete.

The calibration method is derived from the maximum likelihood perspective. That is, we want to find all the parameters (including the sought calibration parameters) which explain the measured dataset best. That is, we pose the calibration problem in the form of $$\underset{x}{\text{minimize}} \frac{1}{2} \sum_{m=1}^{M} \sum_{n=1}^{M} \sum_{k=1}^{K} p(y_{mnk} \mid x) \quad (2)$$

where the parameter vector x includes the receiver positions and clock parameters, as well as the transmitter locations and time of transmissions. Note that the sought calibration parameters are a subset of x. To correctly specify the problem, constraints have to define the coordinate system as well as to define the central clock. The precise constraints are not critical, and one example includes defining the origin using 3 non-collinear receivers (or three non-collinear stationary transmitters) and defining one of the receiver clocks to be the central clock.

The problem (2) can be solved using a standard numerical algorithm if a reasonably accurate initial guess for the parameters is provided. However, obtaining such an initial estimate is difficult in general. Herein we obtain a solution by solving multiple smaller optimization problems.

The calibration problem can be solved by completing the following steps:

1. Construct a setup consisting of M stationary receivers.
2. Place N=M transmitters in close proximity from the receiver antennas and collect a dataset $\mathcal{D}_{\xi} = \{\epsilon_{mnk}\}$. Alternatively, a single transmitter may be moved M times to close proximity of each receiver, each time recording data.

3. Use $\mathcal{D}_{\xi}$ to solve (Solve 1)

$$\underset{x}{\text{minimize}} \frac{1}{2} \sum_{m=1}^{M} \sum_{n=1}^{M} \sum_{k=1}^{K} \epsilon_{mnk}^{2}(x) \quad (3)$$

$$A_m r_m = 0 \quad m = 1, \ldots, 3$$

subject to $\Delta \tau_1 = 0$ $$r_m - t_m = 0 \quad m = 1, \ldots, M$$

Where, minimally, the parameter or state vector x is defined as $$x = \left( \{t_n, \{\tau_{nk}\}_{k=1}^{K}\}_{n=1}^{M}, \{r_m, \Delta \tau_m\}_{m=1}^{M} \right), \quad (4)$$

and the normalized residuals $\epsilon$ are defined as $$\epsilon_{mnk}(x) = \sigma^{-1}(\tau_{nk} + \|r_m - t_{nk}\|_2 + \Delta \tau_m - y_{mnk}), \quad (5)$$

and $$A_1 = \begin{bmatrix} 1 & 0 & 0 \\ 0 & 1 & 0 \\ 0 & 0 & 1 \end{bmatrix}, A_2 = \begin{bmatrix} 0 & 1 & 0 \\ 0 & 0 & 1 \end{bmatrix}, A_3 = \begin{bmatrix} 0 & 0 & 1 \end{bmatrix} \quad (6)$$

The optimization is started in $$x^0 = \left( \{\tilde{r}_n, \{0\}_{k=1}^{K}\}_{n=1}^{M}, \{\tilde{r}_m, 0\}_{m=1}^{M} \right), \quad (7)$$

with $\{\tilde{r}_m\}_{m=1}^{M}$ being a noisy, scaled and rotated version of the actual receiver positions (i.e. the rough topology). The initial calibration parameters obtained are denoted $\{r_m^o, \Delta \tau_m^o\}_{m=1}^{M}$.

4. Collect a dataset $\mathcal{D}_{\xi} = \{\epsilon\{_{mnk}\}$ while moving a single transmitter through the measurement space.

5. Use subsets of $\mathcal{D}_{\xi}$ in combination with (constant) initial calibration parameters $\{r_m^o, \Delta \tau_m^o\}_{m=1}^{M}$ to solve (Solve 2)

$$\underset{t_n, \tau_n}{\text{minimize}} \frac{1}{2} \sum_{m=1}^{M} \epsilon_{mnk}(x) \quad (8)$$

to obtain the initial transmitter trajectory $\{t_n^o, \tau_n^o\}_{n=1}^{N}$.

6. Use $\mathcal{D}_{\xi}$ to solve (Solve 3)

$$\underset{x}{\text{minimize}} \frac{1}{2} \sum_{m=1}^{M} \sum_{n=1}^{M} \sum_{k=1}^{K} \epsilon_{mnk}(x) \quad (9)$$

$$A_m r_m = 0 \quad m = 1, \ldots, 3$$

subject to $\Delta \tau_1 = 0$ where the optimization is started in $$x^o = (\{t_n^o, \tau_n^o\}_{n=1}^{N}, \{r_m^o, \Delta \tau_m^{M} = 1\}) \quad (10),$$

Here, the calibration parameters are part of the parameter vector being optimized.

Optionally, in the case where D2 is exceptionally large, it may be advantageous from a computational point of view to select a subset of D2 for further processing. In such a case it may be advantageous to consider certain parameters in the selection of data from D2 for further processing, such as the quality of the measurement in terms of RS SI, outlier probability and the spatial distribution of the whole dataset.

The calibration calculation procedure is formulated as an optimization problem and hence requires an educated initial guess of the entire parameter vector to bootstrap the calculations. This is especially true for the clock parameters of the receivers and the transmitter times. This initial guess can be obtained by any means, including the preferred method disclosed above, other possible approaches might be to approximately determine the receiver positions using manual surveying, position data derived from building plans and installation plans, GPS or WiFi localization or any other localization method, and to determine the clock parameters using the calibration methods known in the art and use these approximate calibration parameters to calculate an approximate transmitter trajectory and transmission times.

It is important to note that the receiver positions and calibration transmitters placed in the space only need to be known roughly, e.g., with an accuracy of about 20-30% of the average inter-receiver distance (for a practical system this is dictated by the maximum range between a transmitter to a receiver so that the transmitter can still be received by at least 2 receivers). This scenario might significantly alleviate the calibration problem for relatively fixed installations, but is still very labor intensive and not practical for more mobile (nomadic) setups and requires additional equipment and/or measurements.

The preferred solution for obtaining an initial guess of receiver positions and receiver clock parameters exclusively uses the UWB infrastructure itself, as discussed above. We disclose a method using an initial dataset where a transmitter is placed in relatively close proximity of each receiver. Preferably each receiver housing could comprise a transmitter, or alternatively a single transmitter may be kept close to each receiver for a while. Similarly to the method discussed above, we estimate receivers position, receiver clock parameters, transmitter positions and time-of-transmissions, but now we include the additional (and obviously strictly incorrect) constraint that the receiver and transmitter positions coincide exactly. The initial parameter vector for this problem can be an arbitrary non-degenerate configuration of the receivers in combination with zeros for the clock parameters and time-of-transmissions.

To prevent mirrored and/or rotated solutions, the user specifies a very rough receiver topology a priori (inter receiver relative distance accuracy can be worse than 20-30% of inter receiver relative distance, the absolute scale does not need to be known and the rotation of the system also does not need to be known), or optionally, presents a posteriori the calibrated system and its mirrored equivalent to be chosen by the user. The obtained calibration parameters are biased because the constrained physically violated, but provide a good initial guess and be used with any localization algorithm to calculate an approximate transmitter trajectory Typical geometries (tracking of people in buildings, outdoor, agriculture equipment tracking in the field, etc.) are extended in 2 dimensions (horizontally) and often have limited extension in the third dimension. Hence, the vertical achievable accuracy is limited. Even applications with considerable vertical dimension (e.g. a television/film studio) can have bad vertical geometry because typically it is not practical to place receivers below the objects being tracked (e.g. people walking on the floor) as it would mean placing receivers under the floor. Hence, the tracking performance as well as the calibration would benefit from additional information in the height, for example by including barometers (altitude sensors) in the receivers and/or the transmitters.

As noted above, the time-of-arrival measurements in the dataset can contain outliers. Any form of outlier rejection, for example by thresholding measurement residuals and/or using RS SI information, will improve the accuracy of the calibration. Alternatively the occurrence of outliers can be accounted for in the probability distribution of the measurement error, resulting in a non-Gaussian distribution.

Besides time-of-arrival measurements, other information sources (when properly modeled) can be included in the calibration method. Examples include, angle-of-arrival measurements, received signal strength indicators, inertial measurements and motion models of the transmitter, spatial relationships between transmitters, GPS equipment attached to the tag and/or transmitter and known heights or locations of some receivers. As an example consider the case of height measurements of the transmitters and receivers. The height measurements can be obtained from various sources, preferably however the height measurement method is unobtrusive and does not require user input or additional infrastructure. Placing an absolute pressure sensor (barometer) in each receiver and at least the transmitter being used for calibration is a preferred means, but other means such as laser ranging or ranging using ultrasonic sensors can also be used. Other information sources may also have their own advantages. For example, an advantage of using inertial sensor measurements is that under some circumstances the direction of gravity may become measurable with respect of the reader positions. Furthermore, the use of a (3D) magnetic field sensor along with inertial sensors could be used to align the coordinate systems with an earth-defined coordinate system such as WGS84.

Alternatively, for some applications it may be suitable that the height is input a priori and assumed known and fixed, as is currently the case for calibration methods known in the art, the drawback being that the height of each receiver must be measured or surveyed and manually input into the calculation. In any of these cases the height of the receiver is known relative to the height of the transmitter and the calibration problem has to be modified as:

1. Construct a setup consisting of M stationary receivers.
2. Place N=M transmitters in close proximity from the receiver antennas and collect a dataset $\mathcal{D} = \{\gamma_{mnk}\}$.
3. Use to solve (Solve 1)

$$\underset{x}{\text{minimize}} \frac{1}{2}\sum_{m=1}^{M}\sum_{n=1}^{M}\sum_{k=1}^{K}\delta_{mnk}^2(x) + \frac{1}{2}\sum_{m=1}^{M}e_m^2(x) \quad (11)$$

$A_m r_m = 0 \ m = 1, \ldots, 2$ subject to $\Delta \tau_1 = 0$ $r_m - t_m = 0 \ m = 1, \ldots, M$ Where, minimally, the parameter or state vector x is defined as $$x = \left(\{t_n, \{\tau_{nk}\}_{k=1}^{K}\}_{n=1}^{M}, \{r_m, \Delta\tau_m\}_{m=1}^{M}\right), \quad (12)$$

and the normalized residuals $\epsilon,e$ are defined as $$\epsilon_{mnk}(x)=\sigma^{-1}(\tau_{nk}+\|r_m+t_n\|_2+\Delta\tau_m-\gamma_{mnk})$$

$$e_n=\sigma_h^{-1}(t_{n,2}-h_n)$$

$$e_m=\sigma_h^{-1}(r_{m,2}-h_m) \quad (13)$$

And $$A_1 = \begin{bmatrix} 1 & 0 & 0 \\ 0 & 1 & 0 \\ 0 & 0 & 1 \end{bmatrix}, A_2 = [0 \ 1 \ 0]. \quad (14)$$

The optimization is started in $$x^0 = (\{\tilde{r}_n, \{0\}_{k=1}^K\}_{n=1}^M, \{\tilde{r}_m, 0\}_{m=1}^M), \quad (15)$$

with $\{f_m\}_m^M=1$ being a noisy, scaled and rotated version of the actual receiver positions. The initial calibration parameters obtained are denoted $\{r_m^0, \Delta\tau_m^0\}_m^M=1$.

4. Collect a dataset $\mathcal{D}_2=\{\gamma_{mnk}\}$ while moving a single transmitter through the measurement volume.

5. Use subsets of $\mathcal{D}_2$ in combination with (constant) initial calibration parameters $\{_m^0,\Delta\tau_m^0\}_{m=1}^M$ to solve (Solve 2)

$$\underset{t_n,\tau_n}{\text{minimize}} \frac{1}{2}\sum_{m=1}^M \delta_{mnk}^2 + \frac{1}{2}e_n^2(x) \quad (16)$$

to obtain the initial transmitter trajectory $\{t_n^0,\tau_n^0\}_{n=1}^n$.

6. Use to solve (Solve 3)

$$\underset{x}{\text{minimize}} \frac{1}{2}\sum_{m=1}^M\sum_{n=1}^M\sum_{k=1}^1 \delta_{mnk}^2(x) + \frac{1}{2}\sum_{m=1}^M e_m^2(x) + \frac{1}{2}\sum_{n=1}^N e_n^2(x) \quad (17)$$

$$A_m r_m = 0 \ m = 1, \ldots, 2$$

subject to $\Delta\tau_1 = 0$ where the optimization is started in $$x^0=(\{t_n^0,\tau_n^0\}_{n=1}^N,\{r_m^0,\Delta\tau_m^0\}_{m=1}^M) \quad (18)$$

Here, the calibration parameters are part of the parameter vector being optimized.

Figure 3:
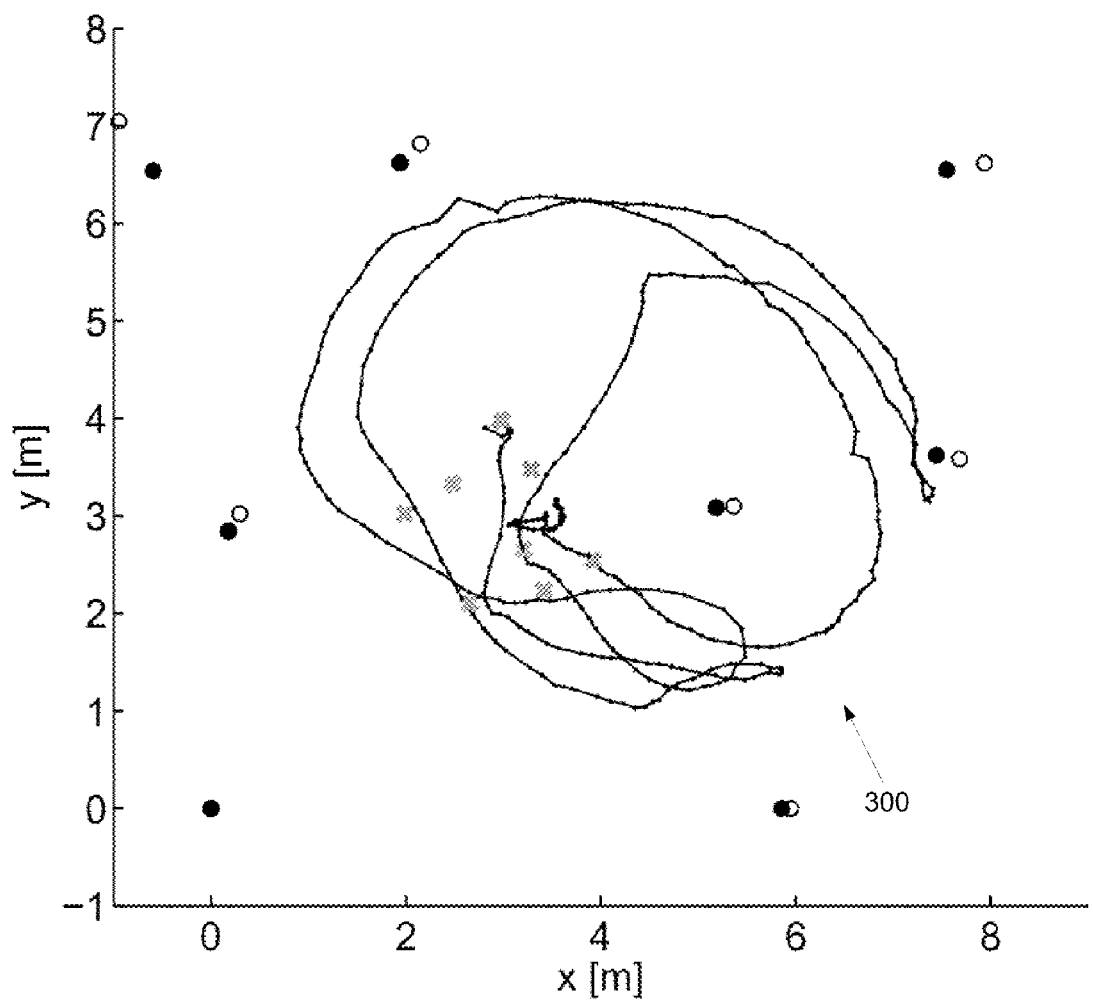
FIG. 3 is a data plot showing sample data corresponding to an example with initial topology guess by user, 8 receivers with positions, and transmitter trajectory.
Figure 4:
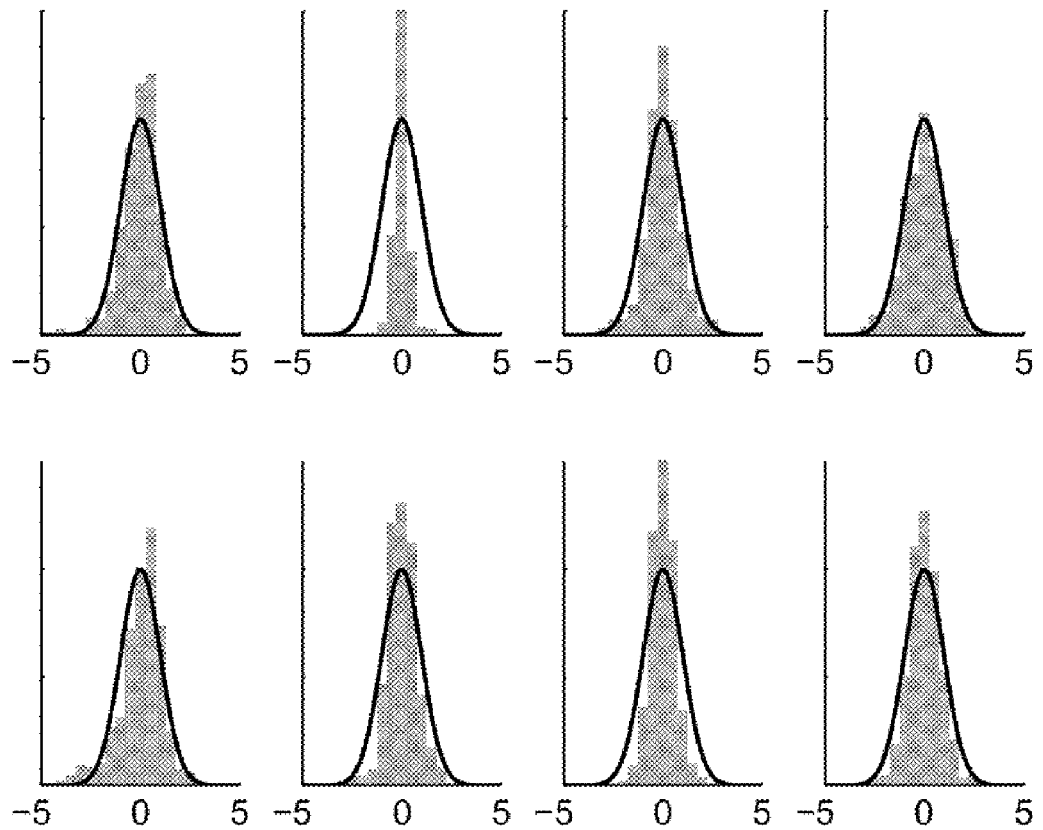
FIG. 4 is a data plot showing statistics of receivers errors post calibration.
Figure 5:
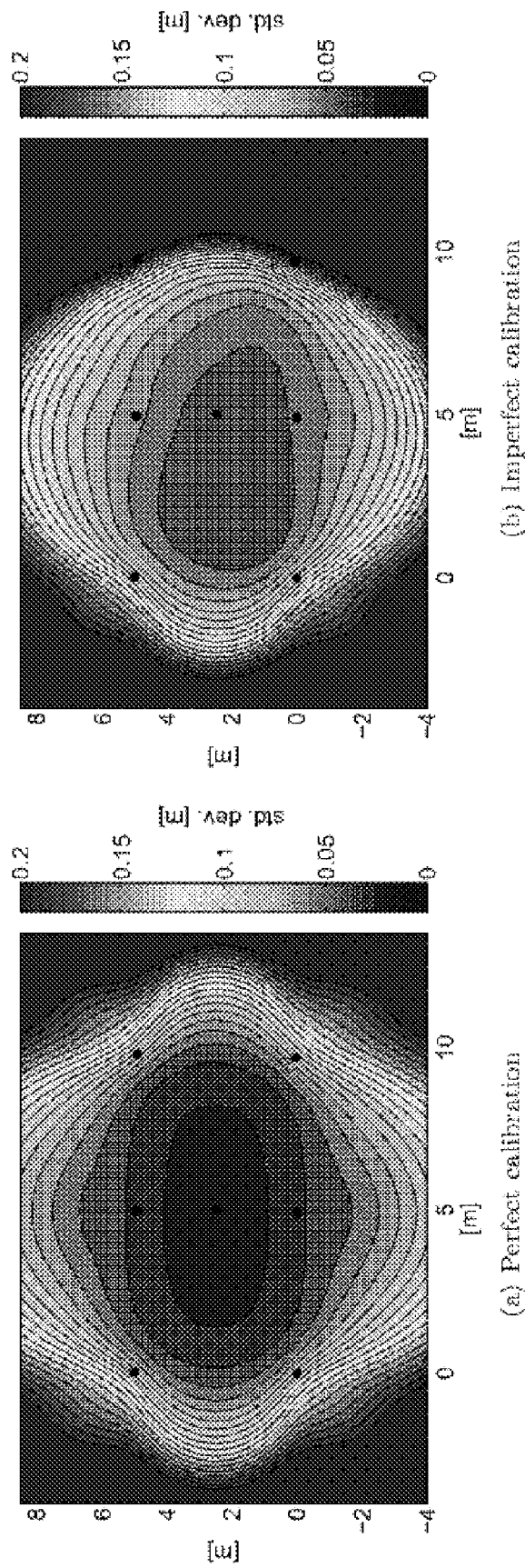
FIG. 5 shows a graphical representation of the theoretically achievable horizontal plane accuracy for 3D tracking in a 7 receiver setup (left) and a graphical representation, derived from the disclosed calibration method, of the impact on accuracy when insufficient data is used in the calibration (right)

FIG. 3 gives sample data 300 corresponding to an example with initial topology guess by user ("x"), 8 receivers with positions (initial calibration parameter receiver positions "○" with errors and final calibration parameter receiver positions "•") and transmitter trajectory (D2). In a related vein, FIG. 4 shows statistics of receivers errors post calibration. As can be seen, all 8 receivers show a normal distribution, indicating a well calibrated system with no offsets. Finally, FIG. 5 shows a graphical representation of the theoretically achievable horizontal plane accuracy for 3D tracking in a 7 receiver setup (left) and a graphical representation, derived from the disclosed calibration method, of the impact on accuracy when insufficient data is used in the calibration (right).

In general, the calibration method presented here can be applied to time-of-arrival measurements from any source. The majority of the description focuses on UWB RF-based positioning systems, but the described principles also apply to other systems that use stationary synchronized receivers and mobile transmitters, or vice-versa, such as for example, acoustic (wideband) systems for use in air or under water.

The dataset of a moving transmitter does not have to be generated exclusively for calibration purposes. Any regular (in-use) measurement can be used equally well. This implies that the calibration can be determined or refined while post-processing the regular in-use measurements, effectively achieving in-use calibration. Furthermore, the moving transmitter can be replaced with spatially distributed stationary transmitters through the space of interest, without requiring their position to be known a-priori, or a combination thereof.

The calibration method is formulated herein as a batch process and is therefore a post processing method. However, extensions include incremental calculations, where new measurements are added to the dataset when they are made and the solution is recalculated in real-time, as well as filter formulations, where using a dynamic model the (possible time varying) calibration parameters can be estimated in real-time. The latter can be seen as a form of 'continuous calibration' and solves practical problems where receivers move, for instance because a user bumps into them or new receivers are added.

Similar to ordinary least squares, the nonlinear least squares formulation of Solve 3 allows calculation of the covariance of the estimated parameter vector, including the calibration parameters. The optimization problems can be written more compactly as $$\min_\theta \frac{1}{2}\|\delta(\theta)\|_2^2$$

s.t. $A\theta = b$ where we have introduced the stacked normalized residual vector $\theta$ and collected the constraints in the linear system $A\theta=b$, with A and b chosen accordingly. A common approximation to this problem is given by $$\min_{\Delta\theta} \frac{1}{2}\delta^T\delta + \delta^T J\Delta\theta + \Delta\theta^T J^T J\Delta\theta$$

s.t. $A\Delta\theta = b - A\theta$ where $J=D_\theta\delta$ is the gradient of the normalized residuals with respect to the parameter vector $\theta$. For this approximated problem, the first order optimality conditions (KKT) conditions can be written as $$\underbrace{\begin{bmatrix} J^T J & A^T \\ A & 0 \end{bmatrix}}_{OK}\begin{pmatrix} \Delta\theta \\ v \end{pmatrix}=\begin{pmatrix} -J^T\delta \\ b-A\theta \end{pmatrix},$$

with v the dual variable associated with the constraint. At the optimum the KKT conditions can be used to obtain the following gradient $$D_\delta\theta=D_\delta\Delta\theta=-(K^{-1})_{11}J^T.$$

Now, application of the Gauss approximation formula, in combination with the fact that normalized residuals have $\text{cov}(\delta)=I$, yields $$\text{cov}(\theta)=[D_\delta\theta]\text{cov}(\delta)[D_\delta\theta]^T=(K^{-1})_{11}J^T J(K^{-1})_{11}=(K^{-1})_{11}.$$

The last equality can be shown by expanding the (1,1)-block of $K^{-1}$ as $$(K^{-1})_{11} = [I-X](J^TJ)^{-1},$$

$$X = (J^TJ)^{-1}A^T(A(J^TJ)^{-1}A^T)^{-1}A.$$

The covariance of the calibration parameters can be used for various forms of user feedback, possible in real-time, for instance by comparing the theoretically achievable tracking accuracy (Covariance of the tracking solution, geometric Dilution of Precision, Cramer Rao lower bound) for a given setup to one which includes the effect of the calibration errors. This user feedback notifies the user of expected system performance during calibration and the user can take appropriate measures directly, such as including more measurements in the calibration, or repositioning the readers, instead of deriving the need for recalibration from inadequate in-use system performance.

The dataset D2 can be collected as described above using various methods, including the use of data collected during normal use of the system (in-use calibration). However, for optimal accuracy the user will collect a specific dataset D2 for calibration purposes only; and while in doing so preferably mounting the transmitter on a stick or similar object to minimize the probability that the body of the user himself will block the line of sight between the transmitter and the various receivers (due to the refraction index of the human body that will slow down the RF signal as well as attenuate it). Such a calibration object, i.e. a stick or other object with a rigidly mounted transmitter, can also incorporate multiple rigidly attached transmitters and the methods described above can be further adapted to utilize the additional constraints present in the collected data D2 between the transmitters on the calibration object, such as known geometric relations between the multiple transmitters.

Figure 6:
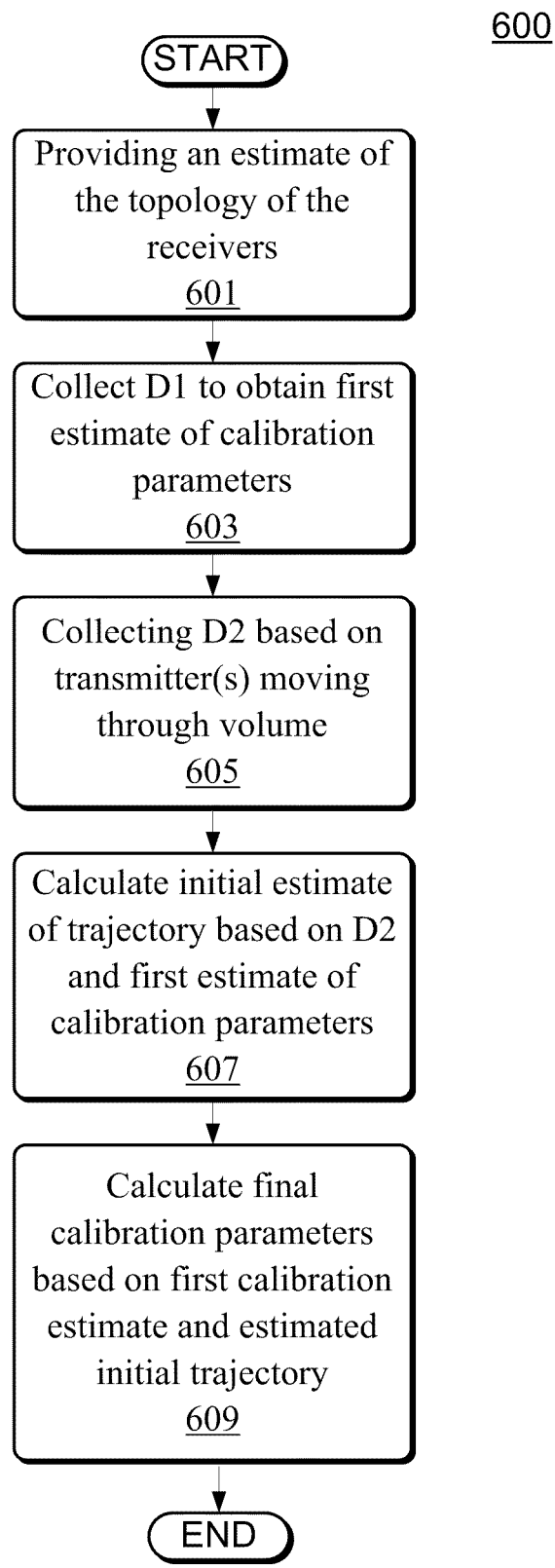
FIG. 6 is a flow chart summarizing the described calibration method according to an embodiment of the invention.

For convenient reference, FIG. 6 is a flow chart summarizing the described calibration method according to an embodiment of the invention. The process 600 assumes a plurality of transmitters communicably linked to at least one receiver for determining position of the plurality of transmitters. At the outset, the process 600 entails providing an estimate of the topology of the receivers at stage 601, as described above. At stage 603, the process 600 entails collecting a first dataset D1 of time of arrival measurements using the transmitters placed in significant proximity to the one or more receivers to obtain a first estimate of calibration parameters. The process 600 next entails collecting a second dataset D2 based on one or more of the transmitters moving through a space of interest at stage 605, and, at stage 607, using the dataset D2 and the first estimate of calibration parameters to calculate a trajectory of the transmitter for each transmission instance to derive an initial estimate of the trajectory of the transmitter. A final set of calibration parameters is calculated at stage 609 based on the first estimate of calibration parameters and the estimated initial trajectory.

It will be appreciated that the steps described above other than the user-implemented manual steps, are executed by computerized execution of computer-executable instructions read from a computer-readable medium such as RAM, ROM, a disc, a flash drive, etc. Such instructions may include program code, data, and or parameters, and may or may not require user input and/or user intervention to operate.

It will be appreciated that the disclosed principles enable an improved system and method for motion capture, certain implementations of which have been described herein. It will also be appreciated, however, that the foregoing methods and implementations are merely examples of the inventive principles, and that these illustrate only preferred techniques. It is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of calibrating a motion capture system having a plurality of transmitters communicably linked to at least one receiver for determining position of the plurality of transmitters, the method comprising:
   providing an estimate of the topology of the receivers;
   collecting a first dataset D1 of time of arrival measurements using a computer device connected to the one or more receivers with the transmitters placed in significant proximity to the one or more receivers to obtain a first estimate of calibration parameters;
   collecting a second dataset D2 of time of arrival measurements via the computer device associated with the one or more receivers based on one or more of the transmitters moving through a space of interest;
   using the dataset D2 and the first estimate of calibration parameters by the computer device associated with the one or more receivers to calculate a trajectory of the transmitter for each transmission instance to derive an initial estimate of the trajectory of the transmitter; and
   calculating a final set of calibration parameters based on the first estimate of calibration parameters and the estimated initial trajectory via the computer device associated with the one or more receivers.

2. The method of calibrating a motion capture system according to claim 1, wherein the plurality of transmitters comprise UWB transmitters.

3. The method of calibrating a motion capture system according to claim 1, wherein the transmitter clocks are not synchronized to the receiver clocks.

4. The method of calibrating a motion capture system according to claim 1, wherein providing an estimate of the topology of the receivers comprises approximately determining the receiver positions using manual surveying.

5. The method of calibrating a motion capture system according to claim 1, wherein providing an estimate of the topology of the receivers comprises approximately determining the receiver positions using one of building plans, installation plans, GPS and WiFi localization.

* * * * *